No. 778,870. PATENTED JAN. 3, 1905.
T. H. LEONARD.
PLANTER.
APPLICATION FILED JULY 28, 1904.
2 SHEETS—SHEET 1.
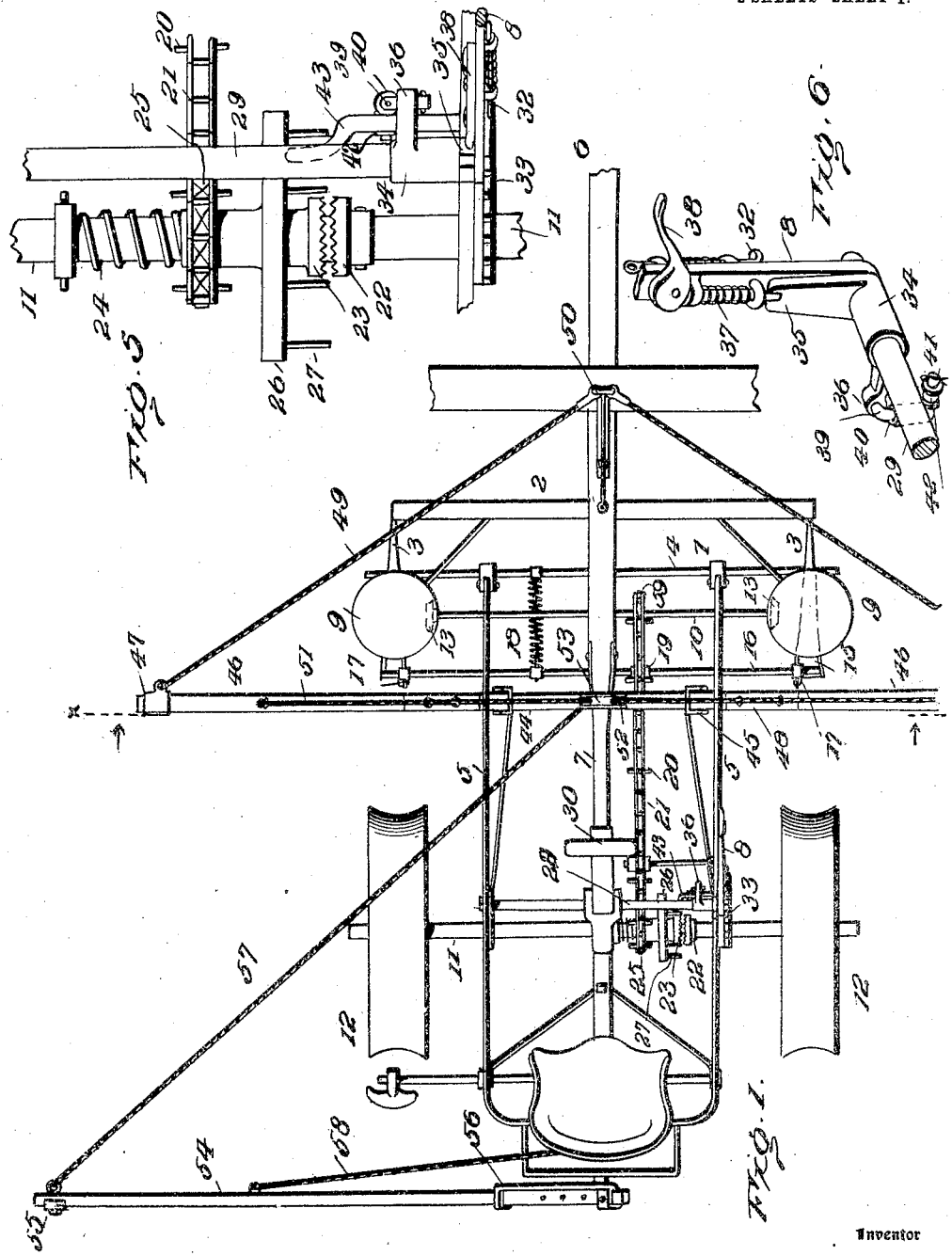
Inventor
T. H. Leonard
Witnesses
By
Attorneys

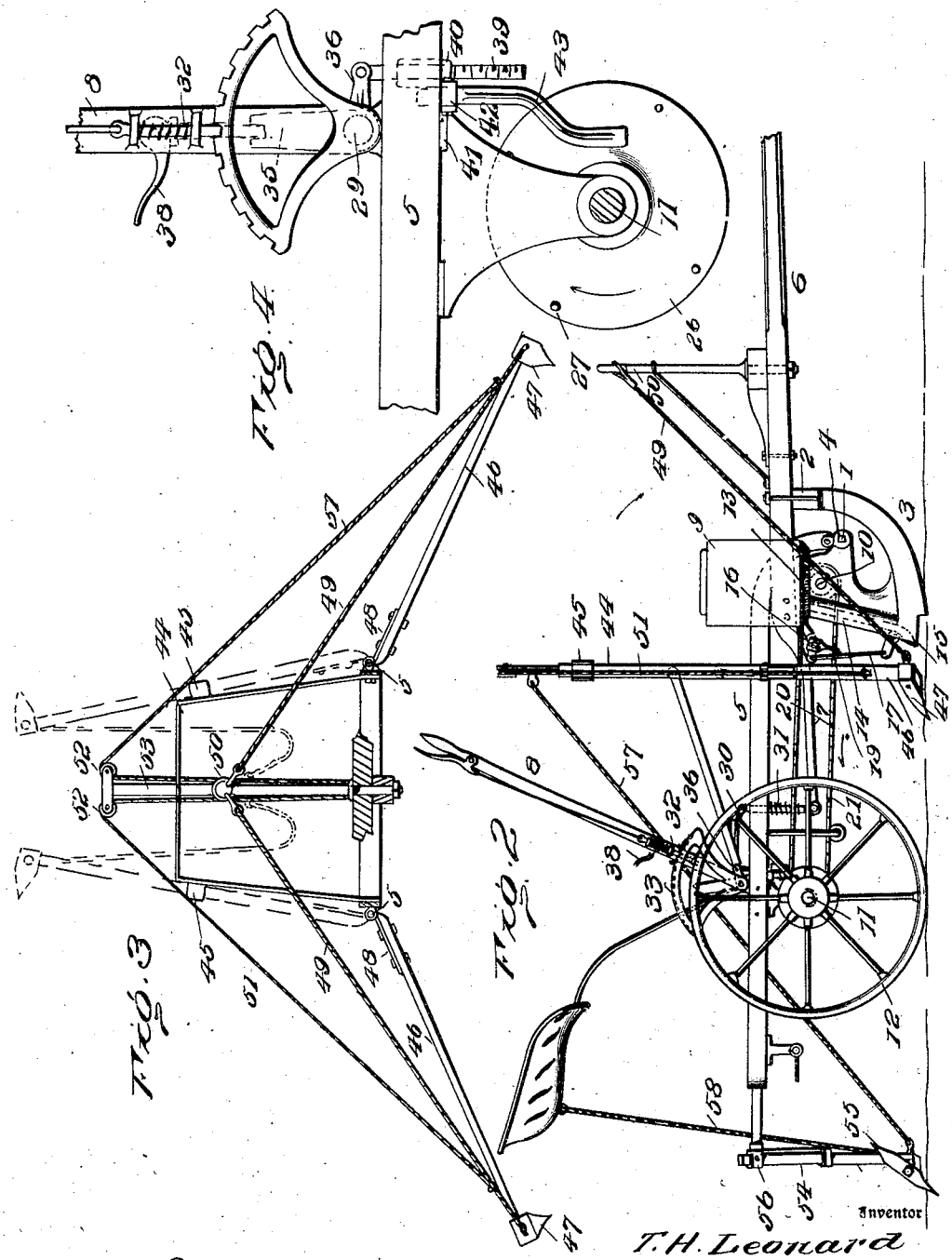

No. 778,870.  
Patented January 3, 1905.

UNITED STATES PATENT OFFICE.

THORNTON H. LEONARD, OF PIQUA, OHIO.

PLANTER.

SPECIFICATION forming part of Letters Patent No. 778,870, dated January 3, 1905.

Application filed July 28, 1904. Serial No. 218,543.

*To all whom it may concern:*

Be it known that I, THORNTON H. LEONARD, a citizen of the United States, residing at Piqua, in the county of Miami and State of Ohio, have invented certain new and useful Improvements in Planters, of which the following is a specification.

This invention aims to provide an agricultural implement of novel and peculiar formation, designed most especially for depositing seed, such as corn, in check-rows, the implement embodying marking devices for properly spacing the rows and setting mechanism for adjusting the seed-dropping mechanism to insure transverse alinement of the hills.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a top plan view of a planter embodying the invention, a portion of one of the markers and a part of the pole and doubletree being broken away. Fig. 2 is a side elevation of the planter. Fig. 3 is a transverse section of the planter on the line $x$ $x$ of Fig. 1 looking to the front as indicated by the arrows, the markers being shown lowered by full lines and elevated by dotted lines. Fig. 4 is a detail view of a portion of the operating-lever, the clutch, and coöperating means whereby the clutch is actuated to throw the machine out of gear. Fig. 5 is a plan view of the parts shown in Fig. 4, including the drive-chain and coöperating gear. Fig. 6 is a detail view in perspective of a portion of the operating-lever, showing the means coöperating therewith for unshipping the clutch when it is required to throw the machine out of gear.

Corresponding and like parts are referred to in the following description and indicated in all the views of the drawings by the same reference characters.

As is common in machines of the type aforesaid, the implement comprises a runner-frame and a wheel-frame, the two frames being pivotally connected, as at 1, to admit of their independent movement when passing over rolling or uneven ground. The runner-frame may be of any construction and, as shown, comprises a transverse bar 2, runners or furrow-openers 3, and a transverse rod or bar 4, to which the front ends of the side bars 5 of the wheel-frame are pivotally connected in any determinate way. The pole or tongue 6 is secured in any substantial manner to the transverse bar 2 and extends in the rear thereof, as indicated at 7, to make connection with the operating-lever 8, by means of which the runner-frame is vertically adjusted and the machine thrown out of gear. The hoppers or seedboxes 9 are mounted directly over the runners, 3 and the seed-dropping mechanism, which may be of usual construction, is set in motion by means of a shaft 10, arranged transversely of the machine and actuated from the axle 11, provided with the ground-wheels 12, which support the wheel-frame. Bevel-gearing 13 connects the shaft 10 with the seed-dropping mechanism for imparting movement thereto as the machine is propelled over the ground. The runners 3 are provided at their rear ends with grain-tubes 14, which are closed at their lower ends by valves 15, which are actuated at stated intervals to effect a release of the grain at the proper time. The operating mechanism for the valves 15 embodies a rock-shaft 16, which extends transversely of the machine parallel with the shaft 10. Links 17 connect arms near each end of the rock-shaft 16 with corresponding arms of the respective valves 15. A spring 18 connects an arm of the rock-shaft 16 with the cross-bar 4 and acts to normally hold the valves 15 closed. An arm 19, projected from the rock-shaft 16, extends into the path of pins 20 of a run or portion of the drive-chain 21, by means of which motion is transmitted from the axle 11 to the shaft 10. The arm 19 is pendent from the rock-shaft 16 and is forked at its lower end to embrace opposite sides of the drive-chain 21, so as to be engaged by opposite ends of the pins 20, projected from opposite sides of the drive-chain. The pins 20 are attached to the drive-chain, so as to operate the rock-shaft and valves 15 at determinate intervals, according to the distance apart of the hills.

The wheel-frame comprises side bars 5, which have their forward ends downwardly curved and loosely connected to the cross-bar 4 in any manner to admit of independent movement of the runner and wheel frames. The axle 11 is journaled to the wheel-frame in any manner and is provided with the ground-wheels 12, connected thereto in the accustomed way, so as to cause the ground-wheels and axle to rotate together. The ground-wheels 12 track with the runners 3, and their rims are hollow or concave and serve as coverers for the grain. A clutch member 22 is secured to the axle 11 to turn therewith and is adapted to coöperate with a companion clutch member 23, loose upon the axle. A coil-spring 24, mounted upon the axle 11, normally exerts a pressure upon the clutch member 23 to hold it in engagement with the clutch member 22. Connected to or forming a part of the clutch member 23 is a sprocket or gear wheel 25, which receives and supports one end of the drive-chain 21. A pin-wheel 26 is likewise attached to or formed with the clutch member 23, and the pins 27 project laterally therefrom, so as to be engaged by the foot of the operator when it is required to adjust the seeding mechanism to insure proper dropping of the seed in straight lines transversely of the field. The front end portion of the drive-chain 21 is supported on a gear-wheel 59, secured to the shaft 10.

The operating-lever 8 is secured to one end of a shaft 29, journaled transversely of the wheel-frame and having an arm 30 at its other end joined to the rear extension 7 of the pole or tongue by means of a spring connection 31. A spring-actuated latch-bolt 32, mounted upon the lever 8, is adapted to coöperate with a toothed segment 33 to hold the shaft 29 and the runner-frame in the adjusted position. The spring connection 31 provides for a limited yielding movement of the runner-frame when passing over clods, ruts, or other uneven places in the surface of the ground. A sleeve 34 is loosely mounted upon the shaft 29 adjacent to the operating-lever 8 and is provided at one end with an arm 35 and at its opposite end with an arm 36. The arm 35 is notched in its outer end to receive a spring-actuated latch-bolt 37, slidably mounted in keepers provided on the operating-lever, and is adapted to be actuated by means of a foot-lever 38, pivotally connected to the operating-lever 8. When the latch-bolt 37 is in engagement with the arm 35, the sleeve 34 and shaft 29 turn together; but when the latch-bolt 37 is disengaged from the arm 35 the shaft 29 may be turned without imparting a corresponding movement to the sleeve 34. A threaded rod 39 is pendent from the outer end of the arm 36 and is pivotally connected thereto and receives a sleeve 40, having a lateral extension 41, upon which is mounted a roller 42, arranged in the path of a pivoted shipper-arm 43, which is arranged to bear laterally against the pin-wheel 26 and move the same away from the fixed clutch element 22, so as to throw the machine out of gear.

An arch 44 is secured to the side bars 5 of the wheel-frame and is provided near the upper ends of its side members with clips 45, which constitute rests for receiving the bars 46 of the starting-markers. The bars 46 are provided at their outer ends with blades 47, which are constructed to penetrate the soil, so as to indicate the last hill at the end of a row and enable correct starting at the beginning of the next row after the machine has been turned around prior to recrossing the field. The bars 46 are adjustably connected at their inner ends to plates 48, hinged to the side bars 5. The starting-markers are in transverse alinement with the lower rear ends of the grain-spouts 14, thereby indicating the place of dropping the last grain at the end of a row. Guy-ropes 49 connect the outer ends of the bars 46 with a standard 50, projected upward from the tongue 6. Other ropes 51, connected to the bars 46 near their outer ends, pass over pulleys 52 at the upper end of a standard 53, projected upward from the rear portion of the tongue 6 at a point in line with the bars 46, and are attached at their lower ends to the runner-frame and are adapted to be drawn upon to raise or lower the markers, as may be required. When traversing the field, the bars 46 are turned upward and are supported by the rests 45. When approaching the end of a row, the marker upon one side is lowered, so as to indicate the last hill and enable the operator to properly start on the return trip, after which the marker is again turned upward out of the way. When approaching the end of the second row, the other starting-marker is lowered into position.

The guide-marker consists of a bar 54, arranged transversely of the machine and provided at its outer end with a point or blade 55, and is adjustably connected at its inner end to a bracket 56, connected to the wheel-frame so as to swing from one side of the machine to the other. A guy-rope 57 is attached at one end to the outer portion of the bar 54 and at its opposite end to the standard 53. An operating-rope 58 is connected at one end to the bar 54 and at its opposite end to a standard within convenient reach of the driver's seat to admit of throwing the bar 54 from one side of the machine to the other, according to the direction of travel.

As the machine is drawn over the field the shaft 10 is rotated by means of the drive-chain 21 and gear-wheels 25 and 59 on the respective shafts 11 and 10. The rock-shaft 16 is operated at stated intervals by means of the pins 20 coming in contact with the arm 19, whereby the valves 15 are moved to permit the grain to drop into the furrows or trenches. When approaching the end of a row, one or the other of the starting-markers is dropped into position to indicate the last hill. The runner-frame is raised by moving the upper end of the operating-lever 8 rearward. If desired, the machine may be simultaneously thrown out of gear with elevating the runner-frame by permitting the latch-bolt 37 to engage with the arm 35. The guide-marker is properly positioned at the beginning of a row by adjusting the machine to cause the blades 55 to enter the indentations formed by the starting-marker at the end of the row just finished. The dropping mechanism may be set to insure transverse alinement of the hills either by moving the pin-wheel 26 forward or slightly retarding its movement, either operation being effected by engagement of the foot with one of the pins 27.

Having thus described the invention, what is claimed as new is—

In a planter, the combination of seed-dropping mechanism, actuating means therefor comprising a clutch, a shipper-arm for throwing the clutch out of gear, an operating-lever, a sleeve mounted in coaxial alinement with said operating-lever and having an offstanding arm, a rod loosely connected with said arm, actuating means for the aforesaid shipper-arm adjustably connected to the rod pendent from said offstanding arm, and means for connecting said sleeve to the operating-lever to cause simultaneous operation of the two, substantially as specified.

In testimony whereof I affix my signature in presence of two witnesses.

THORNTON H. LEONARD. [L. S.]

Witnesses:
   CHAS. V. REECE,
   A. G. KERNS.